United States Patent
Blumhardt

[11] 3,888,382
[45] June 10, 1975

[54] FILTER CAP CONSTRUCTION

[75] Inventor: Harold Blumhardt, Fredonia, N. Dak.

[73] Assignee: Blumhardt Manufacturing, Inc., Ashley, N. Dak.

[22] Filed: Mar. 18, 1974

[21] Appl. No.: 452,274

[52] U.S. Cl. ............... 220/202; 215/307; 215/308; 220/368; 220/371
[51] Int. Cl. .......................................... B65d 51/16
[58] Field of Search ............................ 220/202–209, 220/360, 367, 368, 371, 372; 137/493, 587; 215/307–310

[56] References Cited
UNITED STATES PATENTS

| | | | |
|---|---|---|---|
| 2,396,233 | 2/1946 | Abrams | 220/203 |
| 3,027,043 | 3/1962 | Nestic | 220/203 |

Primary Examiner—William I. Price
Assistant Examiner—Ro E. Hart
Attorney, Agent, or Firm—Merchant, Gould, Smith & Edell

[57] ABSTRACT

A splash free, dust filtering cap construction for use in tanks holding agricultural chemicals. A hollow unitary cap member having an elongated tapered plug portion which fits into the neck of a polyethylene tank is disclosed. A pair of holes in the cap member allow the chamber defined by the hollow cap to act as a passageway. One of the holes is located proximate the bottom end of the plug portion. The plug portion has a recess or depression therein and a cup fits over the bottom of the plug and recess to define a filtration chamber. A tubular member provides a second passageway between the filtration chamber so defined and a tank having a necked opening into which the cap is inserted, since the tubular member opens along the tapered portion of the plug. Means for captivating the plug in a preferred manner to prevent leakage from the filtration system when the cap is removed are also provided.

12 Claims, 5 Drawing Figures

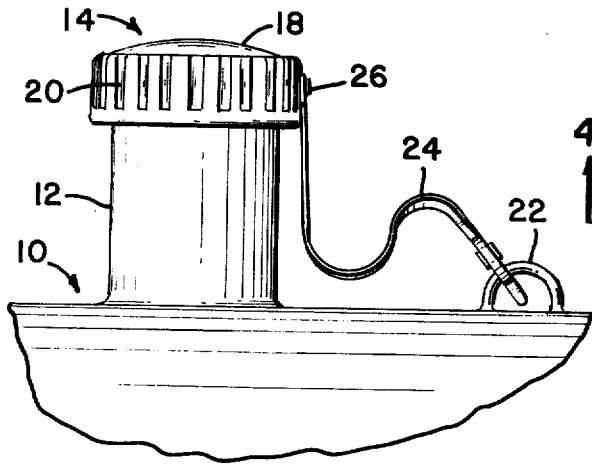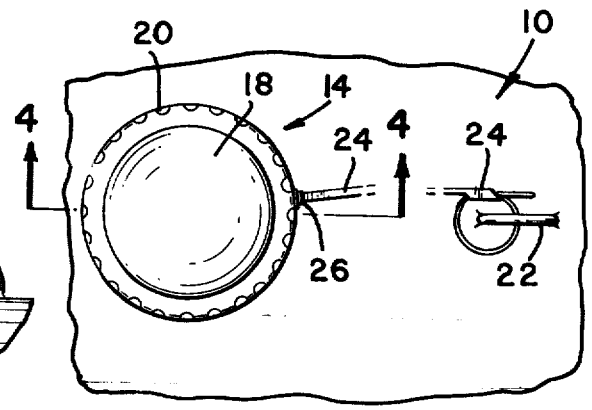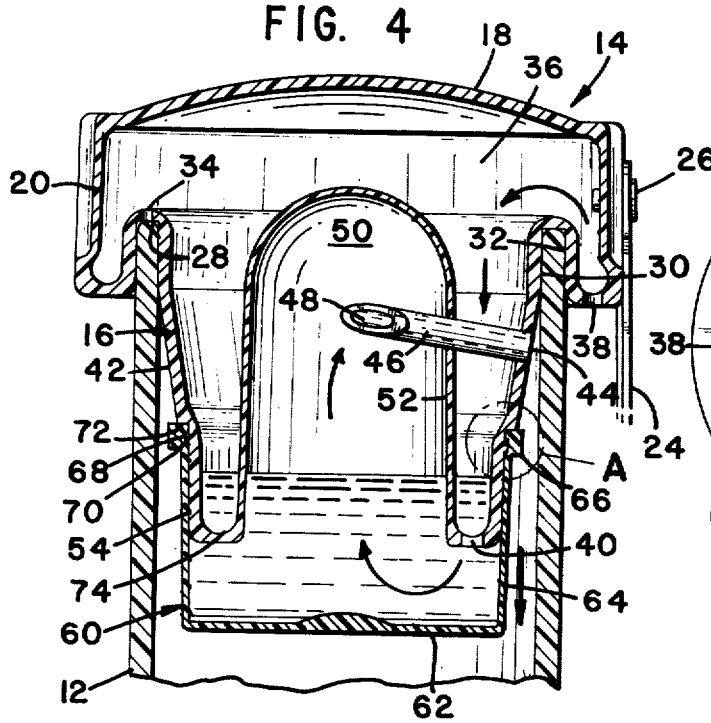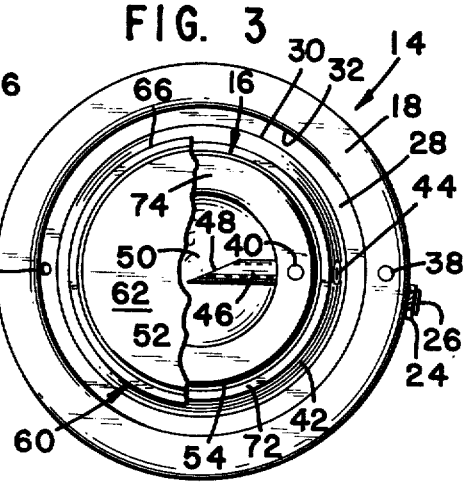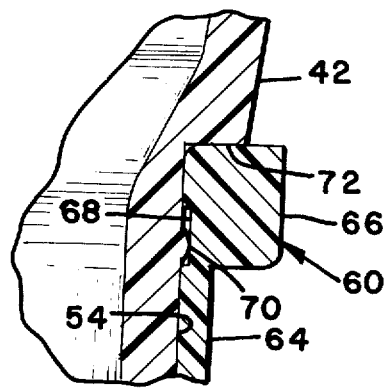

FILTER CAP CONSTRUCTION

BACKGROUND OF THE INVENTION

This invention relates to agricultural equipment and more particularly concerns an improved cap construction especially designed for sealing fill openings on tanks which hold agricultural chemicals such as fertilizers and herbicides during field application.

Prior art caps for agricultural chemical tanks of this type have had a number of disadvantages. Most did not provide adequate sealing of the tank, so that sloshing which occurred during the application of the chemical to the field and crop resulted in leakage of chemical through the neck opening. This chemical would then trickle or spread down the sides of the tank. Since some of the chemicals used are sticky or resinous in nature and environment in which the tanks are used is dusty, the result was substantial accumulation of dirt, sludge and other debris on the outside of the tank. This was unsightly and made the tank difficult to handle.

The caps usually also incorporated an orifice to allow entrainment of air to replace agricultural chemicals removed from the tank during spraying or applicating operation. Since the tank is typically used in environments in which there is considerable dust and other foreign matter present in the air, the entrainment of this dusty air into the tank in combination with repeated filling of the tank results in a layer of sediment deposited upon the bottom of the tank. This mud-like sediment is difficult to remove, poses a serious problem for the person operating the equipment, and can be drawn into the spraying equipment and cause damage to and plugging of that equipment.

The present invention overcomes these problems. It is a cap construction which is relatively easy to fabricate and provides a tight seal to prevent sloshing of agricultural chemical in the tank from causing the liquid to leak out of the fill opening, at the same time providing an integral filtration system in which the primary element is the cap member itself. Furthermore, the present invention uses as its filter medium a small amount of the agricultural chemical itself. This is particularly desirable as it eliminates the necessity for changing filter elements to prevent buildup of sediment. In addition, the cap construction, in its preferred embodiment, is self-loaded by natural sloshing of the chemical in the tank during the field application process.

SUMMARY OF THE INVENTION

In accordance with the invention, the filter cap construction includes a tapered plug for extension downwardly into the neck of a tank opening. The plug has a recess formed in it. Attached to the top of a plug is a cap head portion which extends outward and downward from the plug to define a neck sealing annular groove. The construction includes means defining a first passageway from a first orifice on the exterior surface of the head portion to a second orifice near the bottom end of the tapered plug. A second passageway provides communication between the recess and the tapered portion of the plug below the sealing groove. A cup fits over the bottom end of the plug and covers the first orifice and the recessed area, thus forming a filtration chamber with which both the first and second passageways communicate.

When the cap construction is placed in a neck opening of a tank filled with agricultural chemical, the plug fits toward the interior of the tank and is sized so that it seals to the neck along the sealing groove above the tapered portion of the plug where the second passageway opens. The sealing groove provides a double seal which effectively prevents leakage of the chemical out of the tank during the application procedure. Sloshing of chemical in the tank will cause a certain amount of the chemical to enter the second passageway and be deposited in the filtration chamber. This chemical will then act as the filtration medium. The first passageway will allow air to enter the cap at the head portion and travel through the passageway to the opening near the bottom of the plug. The air will then bubble through the filtration medium created by the chemical and held by the cup means. The air will leave the filtration chamber by means of the second passageway and enter the tank through the opening along the tapered portion of the plug below the sealing groove. The sediment will thus be filtered out of the air and deposited into the bottom of the cup attached to the plug. The cup may be periodically removed and cleaned and will prevent sediment from accumulating in the bottom of the tank.

In certain embodiments the opening in the head portion for the first passageway and the opening along the tapered portion of the plug will be located proximate one another and a member for captivating the tank cap to the tank when it is removed from the fill opening will be fastened to the cap in the same area. With such a construction, when the cap is removed, it will hang from the tank with its openings oriented upwardly to prevent the filtration chemical from leaking out onto and down the side of the tank.

BRIEF DESCRIPTION OF THE DRAWINGS

Other advantages of the invention will be apparent after study of the following detailed description and drawings, wherein the use of like reference numerals throughout the several views is indicative of like elements:

FIG. 1 is a view in elevation showing a cap construction according to the present invention inserted into a fill opening and a portion of a tank including the opening and neck thereof;

FIG. 2 is a plan view of the cap construction and the portion of the tank as shown in FIG. 1;

FIG. 3 is a bottom view of the cap construction illustrating the cup, a portion of which is cut away to reveal the recess in the plug and elements of a passageway;

FIG. 4 is an enlarged sectional view of the cap and a portion of the tank taken along the line 4—4 of FIG. 2; and FIG. 5 is a greatly enlarged view of a portion of the structure of FIG. 4 identified in FIG. 4 by a dotted line circle and reference letter A.

The invention will now be described in connection with the preferred embodiment. It will be understood that the invention is not limited in scope to the embodiment or embodiments described. On the contrary, all alternatives, modifications and equivalents included within the spirit and scope of the invention as defined by the claims are covered.

DETAILED DESCRIPTION OF THE INVENTION

The figures show a portion of a tank generally designated 10 for use in holding fertilizer, herbicide, or pesticide on a vehicle during application to a field. Tank 10 may be constructed of polyethylene or other suitable material which will be inert in the presence of these chemicals. Tank 10 has a generally cylindrical neck 12 which extends upward and is used for filling the tank. Covering the opening in neck 12 is a cap construction generally designated 14. Cap 14 has a longitudinally extended plug portion 16 which extends into neck 12 and seals against the inner surface thereof. Attached to plug portion 16 is a cap head 18 of diameter larger than that of neck 12. For convenience in removal of the cap 14, cap head 18 is provided with a knurled edge area 20. Also for convenience and so that the cap will not be lost when removed from the neck opening 12 it may be fastened to a loop 22 molded into tank 10 by means of a resilient strap member 24. One end of strap member 24 is connected to the knurled surface area 20 with a rivet 26.

FIG. 4 shows a cross-sectional view through neck 12 and cap construction 14 and is illustrative of the operation of the cap construction. As shown in FIG. 4, cap head 18 extends downwardly around the portion of plug 16 which seals to the inner surface of neck 12 to form a sealing groove 28. Sealing groove 28 is bounded by a slightly tapered portion 30 of plug 16 and an inner wall 32 of cap head 18, also slightly tapered. Sealing groove 28 extends around the entire periphery of the plug 16 and is therefore a tapered annular groove. At one side of groove 28 is a relief hole 34 provided for exit of air which would otherwise be trapped by advancing neck 12 when the cap was inserted over the neck, since groove 28 seals on both the interior and exterior surfaces of neck 12. Hole 34 allows air in groove 28 to escape into the central chamber 36 defined by the hollow molded unitary cap construction. Cap 14 has two other holes or orifices which allow air to flow into chamber 36. A first orifice 38 is located on the flat annular surface at the bottom of cap head 18. A second orifice 40 is located at the bottom of the plug portion 16. Plug portion 16 has, as was previously mentioned, a slightly tapered upper sealing surface 30. Adjacent this is a tapered surface 42 which provides two functions. It guides the plug 16 into neck opening 12 at the same time providing clearance for an opening 44 of a tubular member 46 which defines a second passageway in the cap construction. Tubular member 46 may have an opening 48 at the opposite end thereof which is cut at an acute angle to the tubular member axis. Opening 48 opens into a recess or depression 50 in plug 16. In the embodiment shown, this is a generally cylindrically shaped recess defined by an inner wall 52 of plug 16. Depression 50 is closed at its upper end and open at its lower end. The lower end of plug 16 has a cylindrical exterior wall 54. This wall may be slightly tapered but is nearly cylindrical to provide an extensive area for mating with a cup 60. Cup 60 may be a simple cylindrical cup having a bottom portion 62 and side wall 64 as well as a lip 66.

Shown in FIG. 5 is a greatly enlarged view of lip 66 showing an annular groove 68 which may be formed in the inner surface of cup 60 to permit positive holding of the cup by the cap during use of the cap construction. In embodiments using this feature, a mating protruding ring 70 may be formed on surface 54 so that the cup may be positively locked into place about that surface. Plug 16 may also have a shoulder 72 against which the upper edge of the cup 60 may fit when the cap construction is fully assembled.

FIG. 3 shows a bottom view of the cap construction with a portion of cup 60 cut away to reveal the recess or depression 50 and other structure. The outer annular ring is the bottom surface of cap head 18 with orifice 38 drilled therein. The next annular ring represents sealing groove 28 with relief hole 34 therein. The next ring is a projection of tapered surface 42 of plug 16 with opening 44 of tubular member 46 shown proximate orifice 38 for reasons to be described below. The next ring represents shoulder 72 followed by a ring which represents surface 54 of plug 16. Adjacent surface 54 is the bottom of plug 16 showing an annular flat surface 74 having orifice 64 therein. In the center is recess or depression 50 into which tubular member 44 extends.

In normal operation, the cap and cup means are fitted together and the cup is placed into a tank filled with the appropriate agricultural chemical to be applied. The cap construction is forced downward until both inner and outer surfaces of neck 12 contact sealing groove 28. During sealing, relief hole 34 provides relief to atmosphere through chamber 36 and orifice 38. As the tank is transported through the field during the chemical application process, natural sloshing of the chemical in the tank will cause an amount of the chemical to splash up neck 12 between plug 16 and neck 12 through opening 44 and tubular member 46 and to deposit itself in the chamber defined by cup 60 and the recess or depression 50 in the plug. This will provide a filtration medium for the cap construction.

During application of the chemical to the field, a partial vacuum created by pumping the chemical out of the tank will draw air into the tank by means of the path shown by arrows in the sectional view of FIG. 4. The air and its suspended foreign matter will be drawn through orifice 38 thence through the passageway defined by the hollow portion of cap 14 to orifice 40. The air then will bubble through the liquid in cup 60 which will act as a filtration medium and remove dust and other foreign matter. After filtration, the air will flow into the passageway defined by tubular member 46 and will exit opening 44, traveling downward in the clearance space between tapered portion 42, plug 16 and neck 12 to occupy the upper portion of the tank. The present invention thus provides an effective yet inexpensive structure which both seals and filters.

In the preferred embodiment, the cap will be constructed of high density polyethylene material in a unitary cap structure in which the plug and cap head are defined by a single closed wall which defines a chamber having orifices 34, 38 and 40 therein. The result will be a lightweight cap construction in which the chamber is used as an air entraining passageway.

A preferred placement of means for captivating the cap 14 when it is removed from neck 12 to allow filling of the tank or for other reasons is illustrated in FIG. 3. By constructing the cap so that opening 44 and orifice 38 are located in a small arc of the total periphery of the cap and fixing the captivating member 24 to the cap head in close proximity, an additional advantage is achieved. When the cap is removed and hangs from the member 24, its openings will be oriented upward so that the liquid and sediment in cup 60 will not escape and run down the side of the tank.

From the foregoing description it will be apparent that a number of alternatives, modifications or variations might be made without departing from the present invention. While the invention has been described in conjunction with specific embodiments, it is intended that all alternatives, modifications and variations falling within the spirit and scope of the appended claims be covered.

I claim:

1. Cap apparatus for sealing a necked opening in a tank holding agricultural chemicals during field application comprising:
   a. a unitary hollow cap defining a chamber therein, and having a plug portion with an outer surface, which plug portion extends a substantial distance into the neck during use, and an upper larger diameter portion extending outward of the neck during use, said plug portion also having a depression therein;
   b. means defining a passageway from the outer surface of said plug portion to said depression;
   c. a pair of orifices in said cap, a first one of which is placed in said plug portion below said passageway; and
   d. cup means mating with said plug portion and, together with said depression, defining a chamber which communicates with the external surface of said plug portion by means of said passageway and with the atmosphere by means of said orifices.

2. The structure of claim 1 wherein at least a portion of the outer surface of said plug portion is tapered and one end of said passageway opens on said tapered portion.

3. The structure of claim 2 wherein said hollow cap is constructed of polyethylene, and said larger diameter portion and said plug portion overlap to define an annular sealing groove for sealing to a tank neck, the sides of said sealing groove being tapered inwardly to the bottom of the groove.

4. The structure of claim 2 wherein said plug portion has a substantially cylindrical portion below said tapered portion, the cylindrical portion is sized to accept and seal to the cup means, the cylindrical portion has a raised ring extending therearound, and said cup has a circular groove on its inner surface which mates with said ring when the cup means and cap are assembled.

5. The structure of claim 4 wherein said plug portion and said upper portion are axially aligned, and said depression is a generally cylindrical recess formed in said plug portion and extending substantially the entire length thereof.

6. The structure of claim 5 wherein said recess is axially aligned with said plug and upper portions, and the bottom surface of said plug portion is annular with one of said orifices located thereon.

7. The structure of claim 3 wherein said means defining a passageway comprises a polyethylene tubular member, and the end of said member communicating with said depression is cut at an acute angle to the longitudinal axis of said member.

8. The structure of claim 7 wherein said tubular member angles upward from the exterior surface of said plug portion to said depression.

9. A filter cap for use in sealing necked openings in tanks holding agricultural chemicals on vehicles during application, which comprises:
   a. a tapered plug for extension downwardly into the neck of the tank opening, said plug having a recessed area;
   b. a head portion fastened to the top of said plug and extending outward and downward therefrom to define a neck sealing groove between said plug and said head portions;
   c. means defining a first passageway from a first orifice on the exterior surface of said head portion to a second orifice proximate the end of said tapered plug;
   d. means defining a second passageway from said recessed area to said tapered portion below said sealing groove; and
   e. a cup which fits to the end of said plug covering said orifice and, together with said recessed area, forms a chamber.

10. The structure of claim 9 wherein said plug and head portion are a unitary hollow molded member defining an inner chamber, and said first passageway includes said inner chamber and a pair of holes in the molded material.

11. The structure of claim 10 wherein a hole is provided near the bottom of said sealing groove to provide for escape of air from said groove when the cap is placed over a necked opening.

12. The structure of claim 10 wherein said first orifice and the portion of said second passageway opening on the tapered portion of said plug are located proximate one another and fastening means including an elongated member for captivating the filter cap to the tank is connected to said cap adjacent said first orifice.

* * * * *